United States Patent
Ma et al.

(10) Patent No.: US 11,330,764 B2
(45) Date of Patent: May 17, 2022

(54) THRESHING DEVICE WITH TWO-WAY PULL WIRES AND ADJUSTABLE THRESHING CLEARANCE AND COMBINED HARVESTER

(71) Applicant: JIANGSU UNIVERSITY, Jiangsu (CN)

(72) Inventors: Zheng Ma, Jiangsu (CN); Min Han, Jiangsu (CN); Yaoming Li, Jiangsu (CN); Lizhang Xu, Jiangsu (CN); Kechao Ma, Jiangsu (CN); Zhong Tang, Jiangsu (CN); En Lu, Jiangsu (CN); Zhenwei Liang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 283 days.

(21) Appl. No.: 16/626,908

(22) PCT Filed: Mar. 26, 2019

(86) PCT No.: PCT/CN2019/079602
§ 371 (c)(1),
(2) Date: Dec. 27, 2019

(87) PCT Pub. No.: WO2020/186540
PCT Pub. Date: Sep. 24, 2020

(65) Prior Publication Data
US 2021/0329842 A1    Oct. 28, 2021

(30) Foreign Application Priority Data

Mar. 18, 2019 (CN) .......................... 201910203682.9

(51) Int. Cl.
*A01F 12/28* (2006.01)
*A01D 41/127* (2006.01)
(Continued)

(52) U.S. Cl.
CPC .......... *A01F 12/28* (2013.01); *A01D 41/1274* (2013.01); *A01D 75/182* (2013.01);
(Continued)

(58) Field of Classification Search
CPC ........ A10F 12/28; A10F 12/181; A10F 12/24; A10F 12/26; A01D 41/1274; A01D 75/182
See application file for complete search history.

(56) References Cited

U.S. PATENT DOCUMENTS 57,541 A * 8/1866 Melick ..................... A01F 12/28
460/109
1,127,640 A * 2/1915 Knaak ..................... A01F 12/28
460/109

(Continued)

FOREIGN PATENT DOCUMENTS

CN    203340629 U    12/2013
CN    107371641 A    11/2017
(Continued)

*Primary Examiner* — Arpad Fabian-Kovacs
(74) *Attorney, Agent, or Firm* — Saliwanchik, Lloyd & Eisenchenk

(57) ABSTRACT

A threshing device with two-way pull wires and adjustable threshing clearance includes a tensioning mechanism, and several grid bars in clearance fit with side plates, wherein the tensioning mechanism is mounted on the several grid bars so that the grid bars can move in radial and tangential directions in the clearance; the tensioning mechanism includes a tangential tensioning device and a radial tensioning device, wherein the radial tensioning device is mounted in the radial direction of any one of the grid bars, so that the grid bars can move in the radial direction in the clearance; the tangential tensioning device is mounted in series in the tangential direction of the grid bars, so that the grid bars can move in the tangential direction in the clearance. Further disclosed is (Continued)

a combined harvester, which includes the threshing device with two-way pull wires and adjustable threshing clearance.

9 Claims, 5 Drawing Sheets

(51) Int. Cl.
*A01D 75/18* (2006.01)
*A01F 12/18* (2006.01)
*A01F 12/24* (2006.01)
*A01F 12/26* (2006.01)

(52) U.S. Cl.
CPC .............. *A01F 12/181* (2013.01); *A01F 12/24* (2013.01); *A01F 12/26* (2013.01)

(56) References Cited

U.S. PATENT DOCUMENTS

| | | | | |
|---|---|---|---|---|
| 1,449,645 | A | * | 3/1923 | Anderson ............... A01F 12/28 460/110 |
| 3,537,459 | A | * | 11/1970 | Thomas .................. A01F 12/20 460/110 |
| 3,734,103 | A | * | 5/1973 | Mathews ................ A01F 12/32 460/108 |
| 5,395,287 | A | | 3/1995 | Coers |
| 2005/0009591 | A1 | * | 1/2005 | Duquesne ............... A01F 12/28 460/107 |
| 2005/0176483 | A1 | | 8/2005 | Schenk |
| 2016/0316631 | A1 | * | 11/2016 | Davenport, III ........ A01F 12/26 |
| 2017/0164559 | A1 | * | 6/2017 | Matousek ............... A01F 7/062 |
| 2017/0339832 | A1 | * | 11/2017 | Matousek ............... A01F 12/28 |
| 2019/0159403 | A1 | * | 5/2019 | Haar ....................... A01F 12/28 |
| 2019/0166766 | A1 | * | 6/2019 | Robertson ............. A01F 12/185 |
| 2019/0166767 | A1 | * | 6/2019 | Robertson ............. A01F 12/26 |

FOREIGN PATENT DOCUMENTS

| | | | | |
|---|---|---|---|---|
| CN | 108142110 | A | 6/2018 | |
| CN | 108651016 | A | 10/2018 | |
| CN | 112293064 | A * | 2/2021 | ............. A01F 12/24 |
| CN | 112369214 | A * | 2/2021 | ............. A01F 12/24 |
| DE | 3723636 | A1 * | 1/1988 | ............. A01F 12/28 |
| EP | 0628241 | A1 | 4/1994 | |
| EP | 2327290 | A2 * | 6/2011 | ............. A01F 12/24 |
| EP | 2752108 | A2 * | 7/2014 | ............. A01F 12/28 |
| RU | 2150815 | C1 | 6/2000 | |

* cited by examiner

THRESHING DEVICE WITH TWO-WAY PULL WIRES AND ADJUSTABLE THRESHING CLEARANCE AND COMBINED HARVESTER

CROSS REFERENCE TO RELATED APPLICATIONS

This application is a National Stage Application of International Application Number PCT/CN2019/079602, filed Mar. 26, 2019; which claims priority to Chinese Application No. 201910203682.9, filed Mar. 18, 2019.

TECHNICAL FIELD

The present invention relates to the field of agricultural machinery, in particular to a threshing device with two-way pull wires and adjustable threshing clearance and a combined harvester.

BACKGROUND ART

The threshing device is one of the core components of a combined harvester, and its main function is to thresh off cereal grains from stalks. The quality of threshing performance has direct influence on the operating efficiency and performance of the combined harvester, and the size of concave clearance also has influence on the quality of grain harvesting to a certain degree. Failures such as threshing drum clogging may occur in the actual operation of a combined harvester, owing to excessive feed amount or sudden change of feed amount incurred by different cereal planting conditions and different field conditions, etc. Generally, a traditional solution is to shut down the combined harvester and replace the concave plate or adjust the concave clearance, which is time-consuming and labor-intensive. Therefore, it is of great theoretical significance and practical value to make research on threshing clearance adjusting mechanisms of combined harvesters to prevent threshing drum from being clogged, so as to improve the operating efficiency, performance and reliability of combined harvesters. Up to now, researchers in China and abroad have made research and invention on adjusting mechanisms and devices for the concave clearance.

A Chinese patent has disclosed an adjusting device for the concave clearance of a grain threshing drum and a control method thereof. The adjusting device for the concave clearance of the grain threshing drum comprises a top cover, a threshing drum, a concave grid, a stress acquisition module, and a signal receiving and processing system. The detection and data processing and analysis are carried out by the stress on the threshing rack bars, and a feedback signal is transmitted to the driving motor, so as to realize automatic adjustment of the concave clearance of the threshing drum. The invention can be used for detecting stress on the threshing rack bars of the threshing and separating unit and adaptively adjusting the concave clearance of a combined harvester during field harvesting, but the adjustment method is designed for a threshing device in which the threshing rack bars have spike teeth, and is limited in applicability; moreover, the adjustment method is to increase the threshing clearance by rotating one side of the concave plate, which may result in inconsistent concave clearance in the circumferential direction of the drum after the adjustment; if the rotation angle is too great, it may result in under-threshing owing to excessive threshing clearance; if the rotation angle is too small, it may result in clogging on one side of the drum, and may lead to new problems.

A Chinese patent has disclosed an adjusting device for a concave clearance, a threshing device and a harvester. The adjusting device for a concave clearance comprises an actuating mechanism and a reversing mechanism, wherein the actuating mechanism reciprocates in a preset direction and controls a moving concave plate arranged around the drum to move toward or away from the drum, the reversing mechanism is connected to the actuating mechanism and the moving concave plate respectively, so that the movement direction of the moving concave plate is at a first preset angle from the movement direction of the actuating mechanism, and the concave clearance can be adjusted freely, however, the mechanisms are relatively complex and difficult to arrange; moreover, it is unable to uniformly enlarge the threshing clearance by moving the entire concave plate toward or away from the drum to adjust the threshing clearance; consequently, there may be problems that the clearance at the bottom of the drum may be too large while the clearance at both sides of the drum may be too small, or that the clearance at the bottom may be too small while the clearance at both sides may be too large.

A Chinese patent has disclosed a threshing device with adjustable threshing clearance, which comprises a main body, a threshing drum, a concave plate, and a clearance adjusting device, etc., wherein the concave plate is located below the threshing drum, the clearance adjusting device is arranged at four corners of the concave plate, and hydraulic oil cylinders are connected to the main body by bolts, so as to adjust the threshing clearance and achieve the adjustment of the threshing clearance. However, four hydraulic oil cylinders used for adjustment may be non-synchronous in the process of adjustment, since the adjusting devices are arranged at four corners of the concave plate; consequently, the threshing clearance adjustment may be unsuccessful. In addition, since great force is required to move the entire concave plate, the energy consumption may be increased. The integral adjustment of the concave plate may also result in non-uniform threshing clearance after the adjustment, which may have impact on the normal operation of the combined harvester.

A Chinese thesis has put forward a solution to solve the problems of degraded operating performance and threshing drum clogging incurred by fluctuation of feed amount during field operation of a combined harvester. In the solution, the load on the threshing drum is characterized by the oil pressures in the oil cylinders on the back side of the concave grid, a threshing cylinder load monitoring and concave clearance adjusting device composed of an adjusting system for the concave clearance and an acquisition system for back oil pressure of concave grid is designed, the variation of the load on the threshing drum is characterized by monitoring the oil pressures in the rod-less cavities of the hydraulic oil cylinders on the back side of the concave grid, test samples are acquired in field tests, and the influences of the feed amount on the oil pressure in the oil cylinder on the back side of the concave grid and the threshing and separating performance, as well as the influences of the concave clearance on the oil pressure in the oil cylinder on the back side of the concave grid and the threshing and separating performance, are analyzed respectively. However, with such a method, a large number of sensors are required for data acquisition, and several hydraulic oil cylinders are required to work cooperatively, and a large amount of pipelines and cables are required. Therefore, it is inapplicable to the actual operation process of a combined harvester.

A Chinese thesis has described the structural design and working principle of a longitudinal flow threshing and separating device for a corn combined harvester and introduced a design idea of a cylinder, a concave plate, and an adjusting mechanism for threshing clearance in detail. The adjusting mechanism for threshing clearance employs a hinged suspender for adjustment, and the adjustment is made with a manipulating handle and transferred via a pull rod. When turning an adjusting lever, driving a knuckle bearing and pulling a rotary horizontal shaft, the horizontal shaft drives the suspender to move up and down, so that an adjustable concave plate rotates around the shaft, and thereby the threshing clearance is changed. However, the driving mechanism with the pull rod adjustment method is relatively complex, and is inconvenient to implement.

The patents and theses disclosed above have put forward different adjusting devices for a concave clearance, which can be used to adjust the threshing clearance on the basis of different factors in the actual harvesting process, such as the type of cereal, moisture content in the cereal during harvesting, and speed of advance of the combined harvester, etc., so as to ensure quality of grain harvesting performance, and realize automatic control of threshing clearance adjustment to a certain degree. However, the existing researches on threshing clearance adjustment are mainly based on an idea of integral adjustment for the concave plate, mainly including synchronous up-down adjustment of both sides of concave plate and rotational adjustment of one side of concave plate at present. The synchronous up-down adjustment of both sides usually relies on a plurality of hydraulic cylinders to realize the adjustment of the concave plate, which is relatively difficult to implement, and cannot realize fine adjustment. In addition, it is unable to uniformly enlarge the threshing clearance by moving the entire concave plate toward or away from the drum to adjust the threshing clearance; consequently, there may be problems that the clearance at the bottom of the drum may be too great while the clearance at both sides may be too small, or that the clearance at the bottom may be too small while the clearance at both sides may be too large. The rotational adjustment at one side is usually to hingedly fix one side of the concave plate along the axis of the threshing drum, connect the other side of the concave plate to a link mechanism, gear/rack mechanism or hydraulic mechanism, and adjust the concave plate clearance by rotating the concave plate. However, the driving mechanism is relatively complex, the adjustment is not convenient enough, and the of the concave clearance is inconsistent in the circumferential direction of the drum after adjustment; in addition, if the rotation angle is too great, it may result in under-threshing owing to excessive clearance; if the rotation angle is too small, it may result in clogging on one side of the drum, and may lead to new problems. Moreover, the adjustment method is not adaptive to different working conditions, and may affect the threshing performance.

CONTENTS OF THE INVENTION

To overcome the drawbacks in the prior art, the present invention provides a threshing device with two-way pull wires and adjustable threshing clearance and a combined harvester, which can adjust the threshing clearance by adjusting the positions of the grid bars according to the actual conditions of harvesting operation, the adjusting mechanism is relatively simple and easy to operate, can easily realize automatic adjustment and control of the concave clearance, and overcome the existing problems of difficult adjustment of the threshing clearance and the low level of automation.

The above technical objects of the present invention are achieved by the following technical means:

A threshing device with two-way pull wires and adjustable threshing clearance includes a tensioning mechanism, and several grid bars are in clearance fit with side plates, wherein the tensioning mechanism is mounted on the several grid bars, so that the grid bars can move in radial and tangential directions in the clearance.

Furthermore, the tensioning mechanism includes a tangential tensioning device and a radial tensioning device, wherein the radial tensioning device is mounted in the radial direction of any one of the grid bars, so that the grid bars can move in the radial direction in the clearance; the tangential tensioning device is mounted in series in the tangential direction of the grid bars, so that the grid bars can move in the tangential direction in the clearance.

Furthermore, the radial tensioning device includes radial pull wires and a power device; radial pull wires are mounted on both sides of each grid bar in the radial direction respectively, the radial pull wires on both sides are connected with the power device respectively, so that the radial pull wires are tensioned or loosened by means of the power device;

The tangential tensioning device includes tangential pull wires and a power device, the tangential pull wires pass through the grid bars in the tangential direction, and the tangential pull wires are connected with the power device, so that the tangential pull wires are tensioned or loosened by means of the power device.

Furthermore, the power device includes a rotating shaft and an electric motor, the radial pull wires or tangential pull wires are fixed on the rotating shaft, and the electric motor is configured to rotate the rotating shaft.

Furthermore, the power device includes an electric push rod and a pull rod, the radial pull wires or the tangential pull wires are fixed on the pull rod, and the electric push rod is configured to make the pull rod reciprocate.

Furthermore, the threshing device with two-way pull wires and adjustable threshing clearance further includes guide devices, wherein the guide device is arranged between each grid bar and the power device, and the radial pull wires are guided to be parallel to each other by the guide devices, to ensure uniform stress on the radial pull wires simultaneously.

Furthermore, the guide device includes a guide mechanism and a fixing plate, the guide mechanism is fixed to the fixing plate, the fixing plate is mounted to a frame, the radial pull wires pass through guide sleeves, so that the radial pull wires connected to the power device are parallel to each other; the guide mechanisms are guide sleeves or guide pulleys.

Furthermore, the threshing device with two-way pull wires and adjustable threshing clearance further includes elastic gaskets, which are arranged in the radial and tangential directions of the grid bars and are connected to the radial pull wires or tangential pull wires.

Furthermore, the elastic gaskets include lower elastic gaskets, upper elastic gaskets and right elastic gaskets; the radial pull wire includes an upper segment of radial pull wire and an lower segment of radial pull wire, the upper segment of radial pull wire passes through one radial cross section of the grid bar and is connected to the lower elastic gasket; the lower segment of radial pull wire passes through the other radial cross section of the grid bar and is connected to the upper elastic gasket; the right elastic gaskets are arranged on both sides of the grid bar in the tangential direction, and the tangential pull wire passes through the right elastic gaskets; the height of the right elastic gasket does not exceed the height of the grid bar.

A combined harvester includes the threshing device with two-way pull wires and adjustable threshing clearance.

The beneficial effects of the present invention are as follows:

1. In the threshing device with two-way pull wires and adjustable threshing clearance and the combined harvester according to the present invention, the positions of the grid bars are adjusted by means of the tangential tensioning device and the radial tensioning device, thereby achieving the adjustment of the threshing clearance and effectively preventing the clogging problem of the drum of the combined harvester in the working process. The present invention solves the problems that the existing adjusting mechanisms for the concave clearance are complex and simple in structure, the operation is inconvenient, the fine adjustment cannot be realized, and the distribution of the threshing clearance in the circumferential direction is not uniform after the adjustment, etc., the present invention can conveniently and quickly realize the adjustment of the positions of the grid bars separately, and can increase or decrease the threshing clearance in the circumferential direction of the drum synchronously.
2. In the threshing device with two-way pull wires and adjustable threshing clearance and the combined harvester according to the present invention, by operating the tangential tensioning device and the radial tensioning device cooperatively, the problem of instability of the threshing process resulted from the movement of the grid bars is solved effectively, the grid bars can be clamped in the tangential and radial directions after the adjustment to ensure the stability of the grid bars in the operating process, and thereby the operation strength of the threshing concave plate is ensured.
3. In the threshing device with two-way pull wires and adjustable threshing clearance according to the present invention, elastic gaskets are provided to attain a compensation effect to a certain degree, so that each grid bar is subjected to the pulling force of the two-way pull wires to move the position and to be clamped in the radial and tangential directions. The height of the gasket on the right side of the grid bar is lower than the height of the grid bar to prevent the normal operation of the concave plate from being affected.
4. In the threshing device with two-way pull wires and adjustable threshing clearance according to the present invention, the successful turning of radial pull wires can be ensured by the guide device, so that the radial pull wires at the connection points of the grid bars are in the radial direction of the concave plate, and the several radial pull wires are stressed simultaneously and uniformly; thus, the grid bars can be moved by the same displacement and are adjusted synchronously and simultaneously.
5. In the threshing device with two-way pull wires and adjustable threshing clearance according to the present invention, both the tangential tensioning device and the radial tensioning device are arranged in the non-working area at both sides of the concave plate, so that the pull wires and the driving and transmission devices can be arranged conveniently, and are spaced by front and back baffle plates; thus, the interference between the adjusting mechanism for the concave clearance and the working area of the concave plate is prevented effectively.

1—grid bar; 2—elastic gasket; 201—upper elastic gasket; 202—lower elastic gasket; 203—right elastic gasket; 3—fixing plate; 4—radial pull wire; 401—upper segment of radial pull wire; 402—lower segment of radial pull wire; 5—guide sleeve; 6—rotating shaft A; 7—electric motor; 8—tangential pull wire; 9—rotating shaft B; 10—side plate; 3'—guide pulley; 5'—slide channel; 6'—pull rod A; 601'—upper pull rod A; 602'—lower pull rod A; 7'—electric push rod; 9'—pull rod B; 11—threshing element; 12—threshing drum.

EMBODIMENTS

Hereunder the present invention will be further detailed in embodiments with reference to the drawings, but the protection scope of the present invention is not limited thereto.

Figure 1:
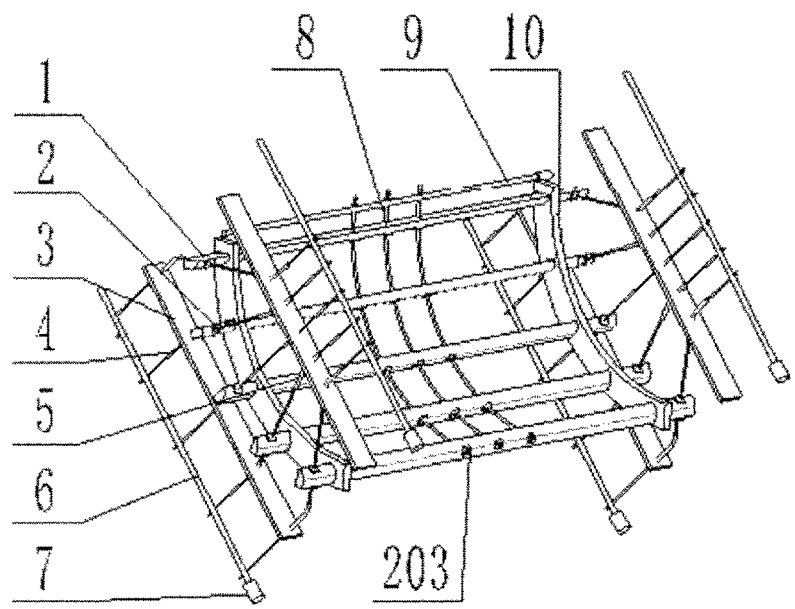
FIG. 1 is a 3D structural view of embodiment 1 of the present invention.
Figure 2:
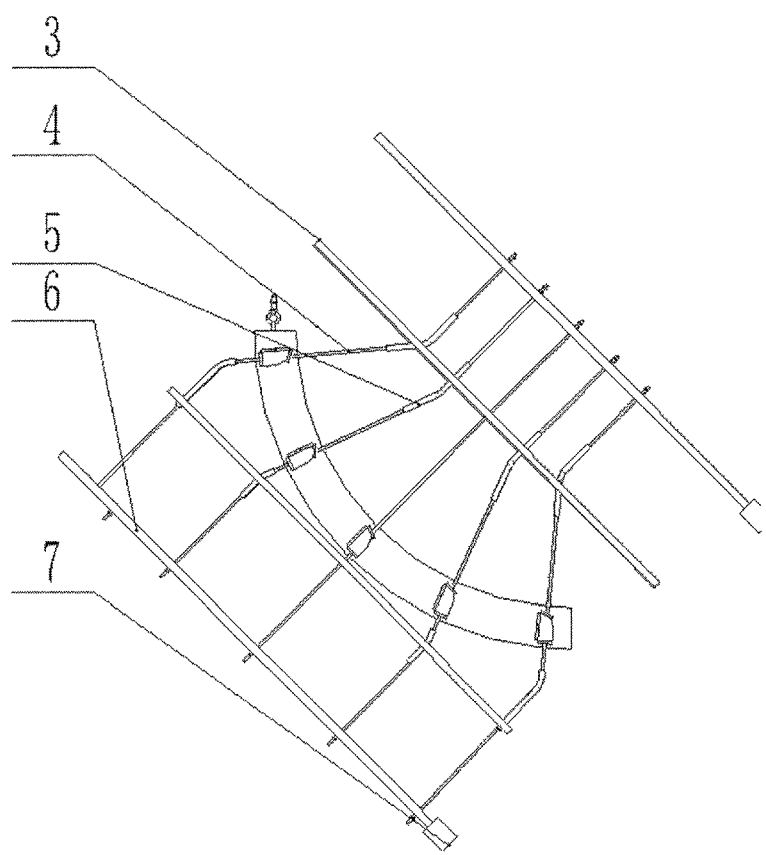
FIG. 2 is a left view of embodiment 1 of the present invention.

An existing grid concave plate includes grid bars 1 and side plates 10. As the structure belongs to the prior art, the specific structure of the grid concave plate is not described. In an embodiment 1 as shown in FIGS. 1 and 2, the threshing device with two-way pull wires and adjustable threshing clearance according to the present invention includes a tensioning mechanism, which includes elastic gaskets 2, a fixing plate 3, radial pull wires 4, guide sleeves 5, a rotating shaft A 6, an electric motor 7, tangential pull wires 8, and a rotating shaft B 9. The grid bars 1 are mounted in holes of the side plates 10, and have certain clearance in the radial and tangential directions, so that the grid bars 1 can be moved in the radial direction and thereby the threshing clearance can be adjusted. The size of the radial clearance is determined according to the clearance required in the threshing process. There are holes in the radial direction on both sides of each grid bar and several holes evenly distributed in the tangential direction in the middle part. The rotating shaft A 6 is arranged on two side edges of the concave plate and in the radial direction of the grid bars 1 respectively, one end of each radial pull wire 4 passes through a radial hole of the grid bar 1 and then is fixed to the elastic gasket 2, the other end of the radial pull wire 4 is fixed to the rotating shaft A 6, the electric motor 7 rotates the rotating shaft A 6 so that the radial pull wire 4 generates a pulling force in the radial direction to move the grid bars 1 in the radial direction and thereby adjust the concave clearance. One end of the tangential pull wire 8 passes through the grid bar 1 in the tangential direction, the tangential pull wire 8 generates a pulling force on the grid bar 1 in the tangential direction, the other end of the tangential pull wire 8 is fixed to the rotating shaft B 9, so that the grid bar 1 can be clamped in the tangential direction. The clamping in the radial direction and the clamping in the tangential direction ensure the operation strength of the grid bars. An upper elastic gasket 201 and a lower elastic gasket 202 are mounted on the grid bars 1 in the radial direction, so that the grid bars 1 can be clamped in the radial direction after the adjustment. A right elastic gasket 203 is fixed at the connection point between the grid bar 1 and the tangential pull wire 8, so that the grid bars 1 can be clamped in the tangential direction after the adjustment, to ensure the operation strength of the concave plate.

Figure 3:
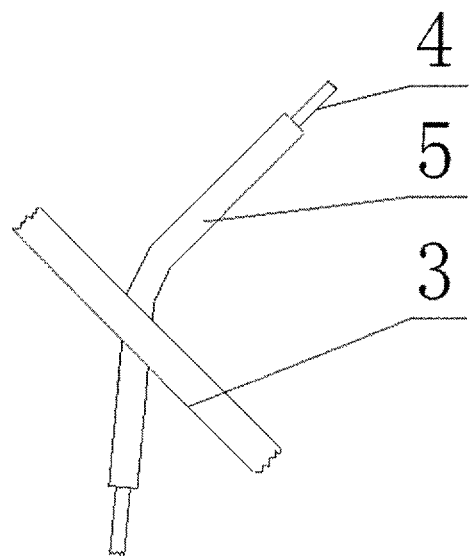
FIG. 3 shows the guide device in embodiment 1 of the present invention.

As shown in FIGS. 2 and 3, the radial pull wires 4 pass through the guide sleeves 5, which make several pull wires at the connection points between the radial pull wire 4 and the rotating shaft A 6 to be parallel to each other and perpendicular to the rotating shaft A 6, to ensure that the radial pull wires 4 are stressed simultaneously and uniformly, i.e., to ensure that the grid bars 1 are adjusted synchronously. The fixing plate 3 is configured to fix the guide sleeves 5, and is fixed to a frame to ensure the successful turning of the radial pull wires 4.

Figure 8:
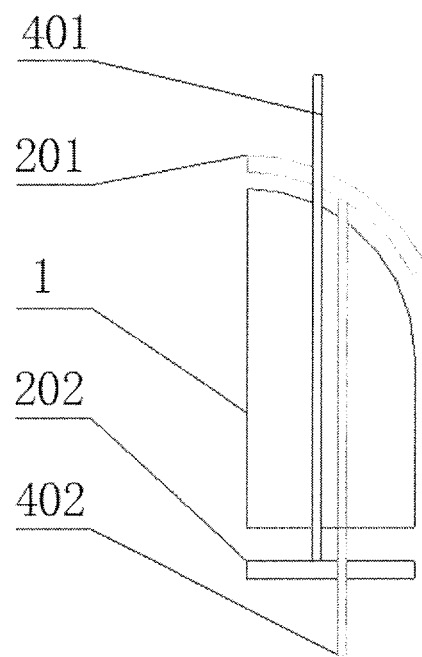
FIG. 8 is a sectional view of the connection between the grid bars and the radial pull wires in the present invention.

As shown in FIG. 8, the radial cross section of the grid bar 1 is a rectangle with rounded corners, the grid bar 1 is in an arc surface in the cereal feeding direction to reduce damage to the material by the grid bar 1, both sides of the grid bar 1 in the tangential direction are flat surfaces to facilitate clamping, so as to keep the grid bar 1 in a steady state during operation. The radial pull wire 4 is divided into an upper segment 401 of radial pull wire and a lower segment 402 of radial pull wire, which are independent from each other. The upper segment 401 of radial pull wire passes through the grid bar 1 and is connected to the rotating shaft A 6 above the grid bar 1, the lower segment 402 of radial pull wire passes through the grid bar 1 and is connected to the rotating shaft A 6 below the grid bar 1, the lower elastic gasket 202 is fixedly connected to the upper segment 401 of radial pull wire, the upper elastic gasket 201 is fixedly connected to the lower segment 402 of radial pull wire, the right elastic gaskets 203 are equally fixed on the tangential pull wire 8. The existence of the elastic gaskets 2 ensures that each grid bar can be fixed and clamped under the pulling force of the two-way pull wires, and thereby ensures the operation strength of the concave plate of the combined harvester during the actual operation process. The elastic gaskets 2 are made of polyurethane elastomer, which has a wide hardness range and high resilience. The lower elastic gasket 202 is in a square shape and fixedly connected to the upper segment of radial pull wire; the upper elastic gasket 201 is in an arc-shape and fixedly connected to the lower segment of radial pull wire; the right elastic gasket 203 is in a square shape, and the height of the right elastic gasket 203 does not exceed the height of the grid bar to prevent the normal operation of the grid bar from being affected; the right elastic gaskets 203 are equally fixed on the tangential pull wire. The existence of the elastic gaskets ensures that each grid bar can be fixed and clamped under the pulling force of the two-way pull wires, and thereby ensures the operation strength of the concave plate.

Figure 9:
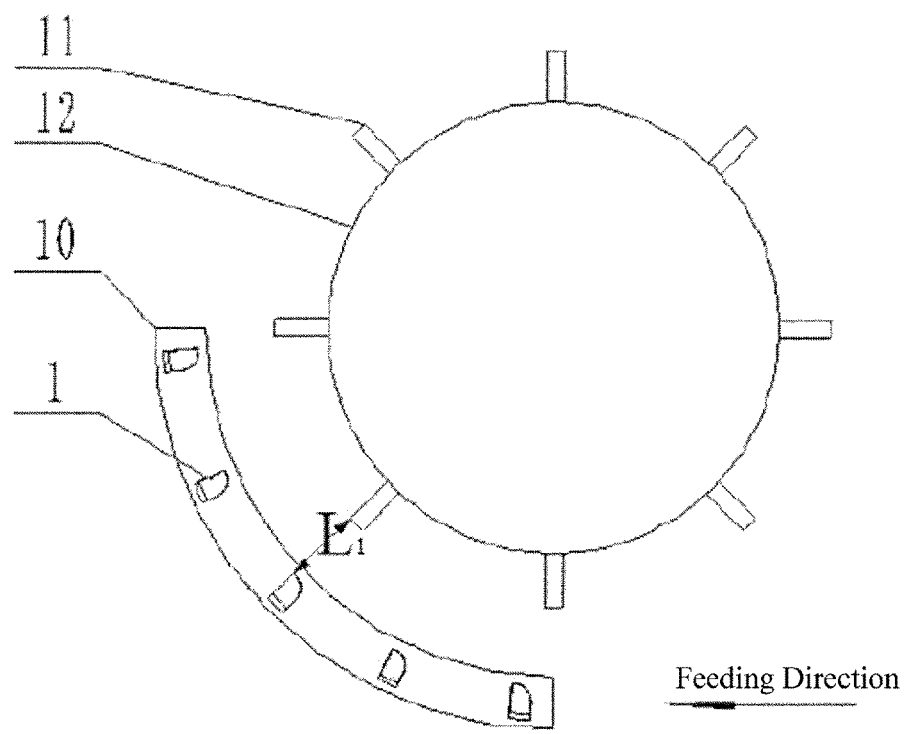
FIG. 9 is a front view of the grid bars and the threshing drum during normal operation.
Figure 10:
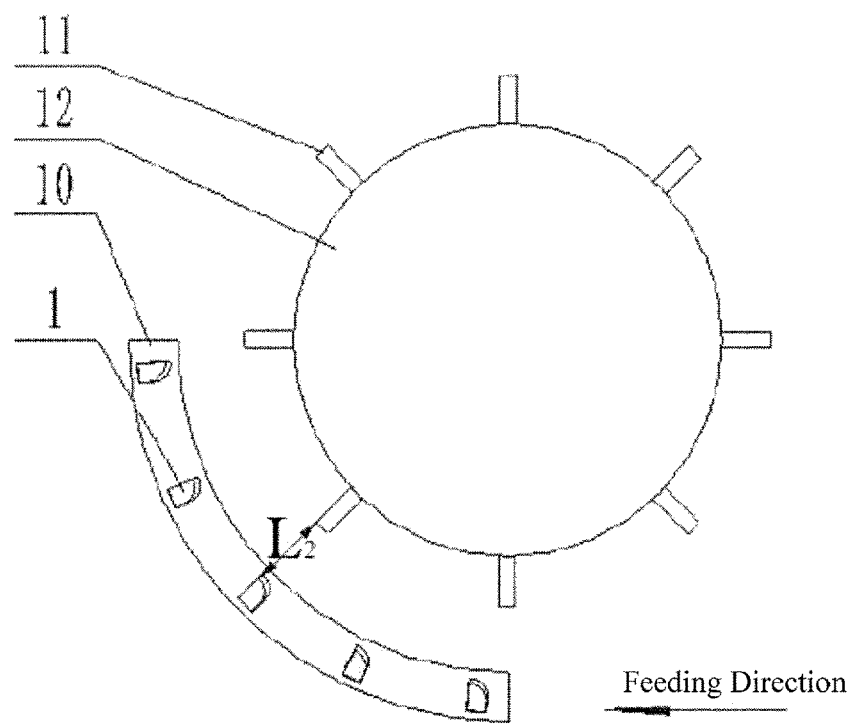
FIG. 10 is a front view of the grid bars and the threshing drum after the clearance is increased normally.

The working process of the embodiment 1 is as follows:

When the combined harvester starts to work, the material is feed through a conveying chute into the threshing device, and collides and rubs against the concave grid under the impact of the threshing drum at a high speed to realize threshing. When the combined harvester operates normally, the upper segments 401 of radial pull wire and the tangential pull wires 8 are in a tensioned state, and the grid bars are clamped, as shown in FIG. 9, in which the threshing clearance is $L_1$ when the grid bars 1 and the threshing drums 12 are at the indicated positions. However, in the actual operation process, the feed amount may fluctuate with the distribution density of the crops in the field. An excessive feed amount or severe fluctuation of feed amount may directly result in change of the load on the threshing drum 12, and even may result in clogging of the threshing drum 12. When possible clogging is detected, the upper segments 401 of radial pull wire and the tangential pull wires 8 are loosened quickly, the electric motor 7 below the grid bars 1 drives the rotating shaft A 6 to rotate a certain angle, so that the lower segments 402 of radial pull wire drive the grid bars 1 to move down in the radial direction and clamp the grid bars 1; then the rotating shaft B 9 rotates a certain angle, so that the tangential pull wires 8 clamp the grid bars 1 in the tangential direction, and thereby the threshing clearance is increased, as shown in FIG. 10, in which the threshing clearance is increased to $L_2$. After the risk of clogging of the threshing drum 12 is eliminated, the upper segments 401 of radial pull wire and the tangential pull wires 8 are loosened quickly, the electric motor 7 above the grid bars 1 drives the rotating shaft A 6 to rotate at a certain angle, so that the upper segments 401 of radial pull wire drive the grid bar 1 to move up in the radial direction and clamp the grid bars 1; then the rotating shaft B 9 rotates at a certain angle, so that the tangential pull wires 8 clamp the grid bars 1 in the tangential direction, and thereby the threshing clearance is decreased, i.e., the threshing clearance is restored to $L_1$.

Figure 4:
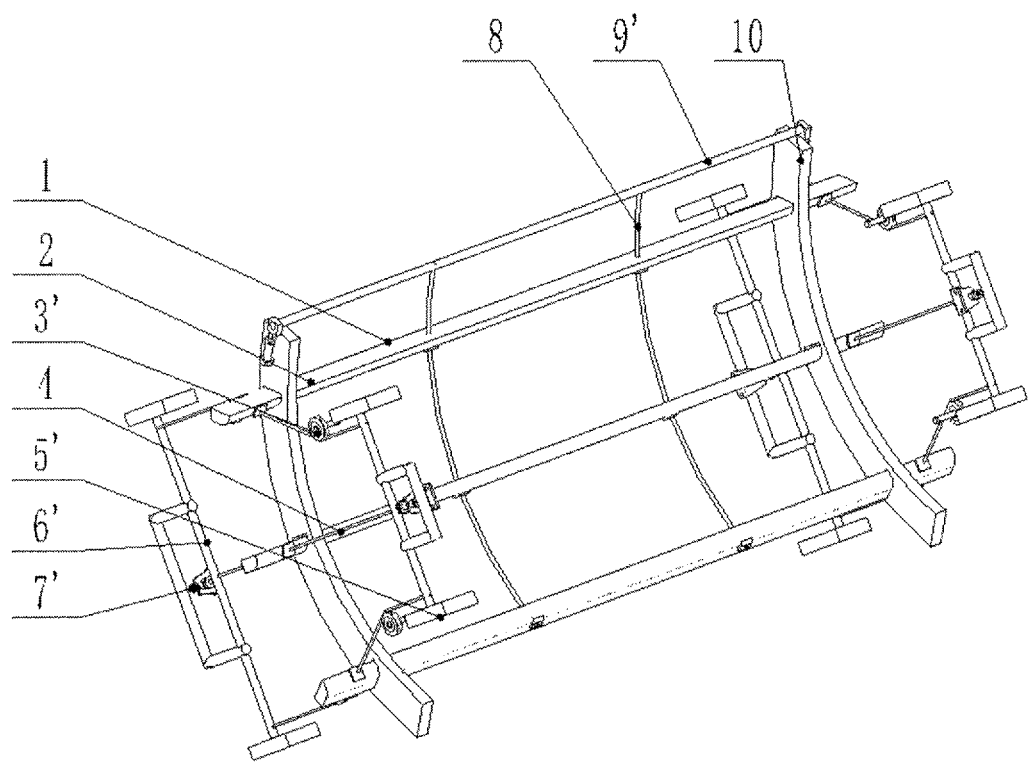
FIG. 4 is a 3D structural view of embodiment 2 of the present invention.
Figure 5:
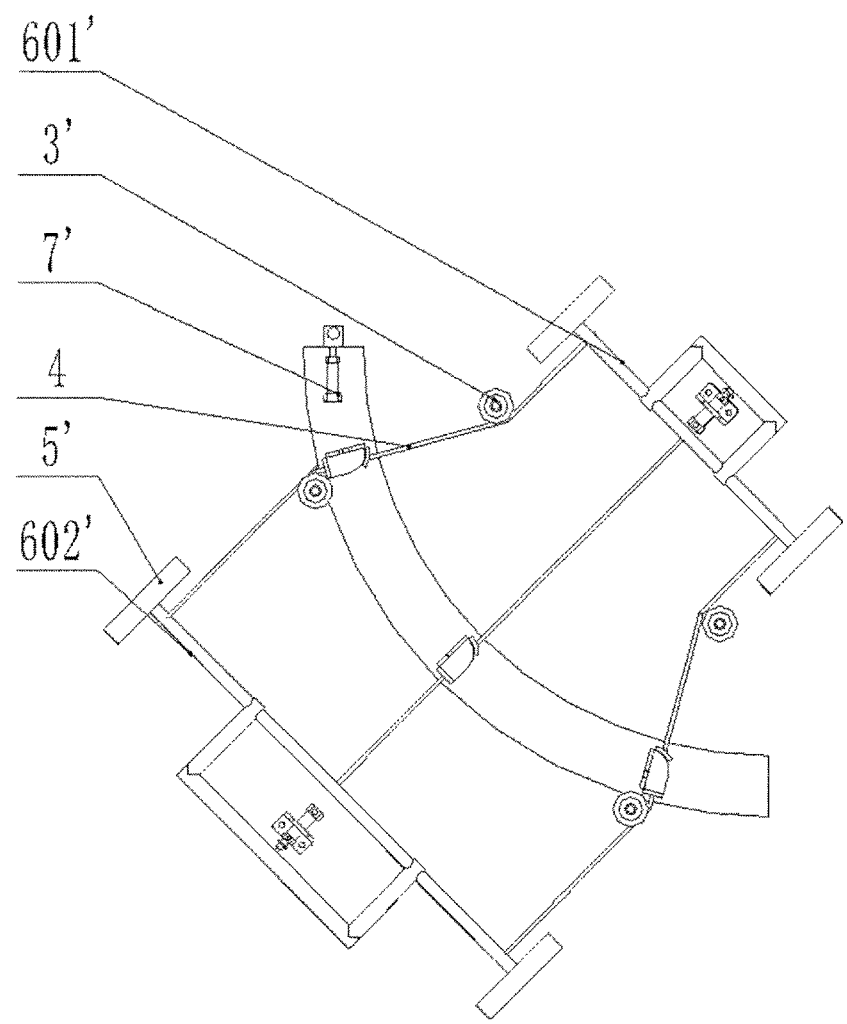
FIG. 5 is a left view of embodiment 2 of the present invention.
Figure 7:
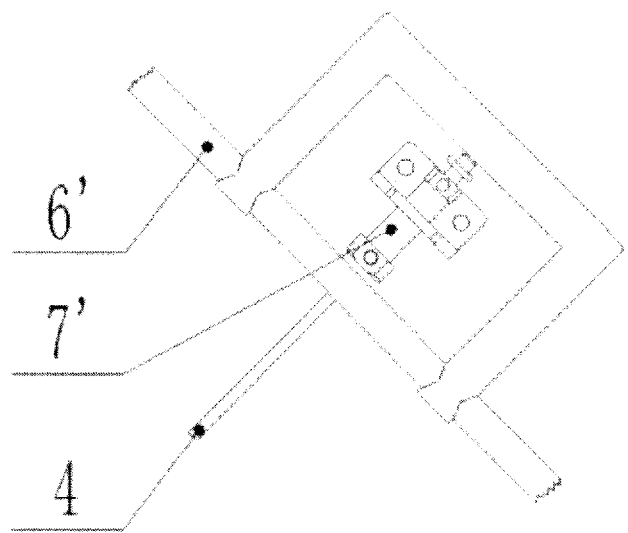
FIG. 7 shows the power device in embodiment 2 of the present invention.

In an embodiment 2 as shown in FIGS. 4, 5 and 7, the threshing device with two-way pull wires and adjustable threshing clearance according to the present invention includes a tensioning mechanism, which includes elastic gaskets 2, guide pulleys 3', radial pull wires 4, a slide channel 5', a pull rod A 6', an electric push rod 7', tangential pull wires 8, and a pull rod B 9'. The grid bars 1 are mounted in the holes of the side plates 10, and have certain clearance in the radial and tangential directions, so that the grid bars 1 can be moved in the radial direction and thereby the threshing clearance can be adjusted. There are holes in the radial direction on both sides of each grid bar and several holes evenly distributed in the tangential direction in the middle part. An upper pull rod A 601' and a lower pull rod A 602' are arranged on two side edges of the concave plate and in the radial direction of the grid bars 1, one end of the radial pull wire 4 passes through a radial hole of the grid bar 1 and then is fixed to an elastic gasket 2, and the other end of the radial pull wire 4 is fixed to the upper pull rod A 601' or the lower pull rod A 602'; one end of the tangential pull wire 8 passes through the grid bars 1 in the tangential direction, the tangential pull wire 8 generates a pulling force on the grid bars 1 in the tangential direction, and the other end of the tangential pull wire 8 is fixed to the pull rod B 9'.

As shown in FIG. 7, both the middle part of the pull rod A 6' and the middle part of the pull rod B 9 are connected to the electric push rod 7'. The electric push rod 7' is fixedly connected to the frame. The movement of the electric push rod 7' drives the pull rod A 6' to move along the slide channel 5', and thereby drives the radial pull wires 4 to generate a pulling force on the grid bars 1 in the radial direction, so that the grid bars 1 can be moved up and down in the radial direction, and thereby the concave clearance is adjusted. The movement of the electric push rod 7' connected to the pull rod B 9' drives the pull rod B 9' to generate a pulling force on the tangential pull wires 8 in the tangential direction, so that the grid bars 1 are clamped in the tangential direction to ensure the operation strength of the grid bars 1.

Figure 6:
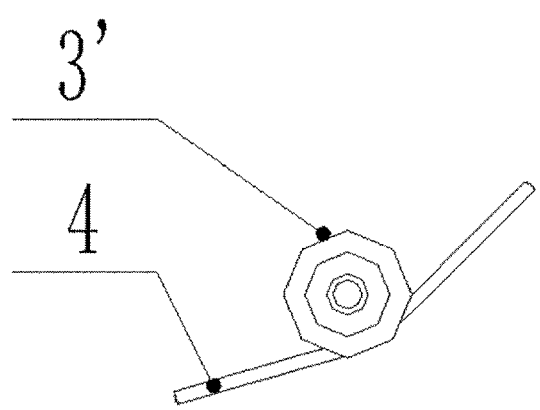
FIG. 6 shows the guide device in embodiment 2 of the present invention.

As shown in FIG. 6, guide pulleys 3' are fixed above and below the grid bars 1 respectively to ensure the successful turning of the radial pull wires 4, so that several pull wires at the connection points between the radial pull wires 4 and the pull rod A 6' are parallel to each other and perpendicular to the pull rod A 6', to ensure that the radial pull wires 4 are stressed simultaneously and uniformly, i.e., to ensure that the grid bars 1 are adjusted synchronously. The length of the grid bars 1 is greater than the distance between two side plates 10, the whole pull wire device and the electric push rod are evenly distributed at both sides of the concave plate, and are separated from the working area of the concave plate by baffle plates to prevent the normal operation of the concave plate from being affected by the clearance adjustment.

As shown in FIG. 8, both the upper segment 401 of radial pull wire and the lower segment 402 of radial pull wire pass through the same radial hole and are independent from each other, and the diameter of the radial hole is slightly greater than two times of the diameter of the radial pull wire 4, so that the two segments of pull wire can pass through the radial hole successfully; the diameter of the tangential hole is slightly greater than the diameter of the tangential pull wire 8.

The threshing device with two-way pull wires and adjustable threshing clearance according to the present invention may be applied on a combined harvester, by mounting the tensioning mechanism at the outer side of the concave plate and mounting the concave plate below the threshing drum.

The above-mentioned embodiments are some preferred embodiments of the present invention, but the present invention is not limited to these embodiments. Any obvious improvement, replacement, or variation that can be made by the person skilled in the art without departing from the spirit of the present invention should be deemed as falling within the protection scope of the present invention.

The invention claimed is:

1. A threshing device with two-way pull wires and adjustable threshing clearance, the threshing device comprising:
   a tensioning mechanism; and
   several grid bars in clearance fit with side plates,
   wherein, the tensioning mechanism is mounted on the several grid bars, so that the grid bars can move in radial and tangential directions in the clearance,
   wherein the tensioning mechanism comprises a tangential tensioning device and a radial tensioning device,
   wherein the radial tensioning device is mounted in the radial direction of any one of the grid bars, so that the grid bars can move in the radial direction in the clearance,
   wherein the tangential tensioning device is mounted in series in the tangential direction of the grid bars, so that the grid bars can move in the tangential direction in the clearance.

2. The threshing device with two-way pull wires and adjustable threshing clearance according to claim 1, wherein the radial tensioning device comprises radial pull wires and a power device,
   wherein the radial pull wires are mounted on both sides of each grid bar in the radial respectively,
   wherein the radial pull wires on both sides are connected with the power device, respectively, so that the radial pull wires are tensioned or loosened by means of the power device;
   wherein the tangential tensioning device comprises tangential pull wires and a power device,
   wherein the tangential pull wires pass through the grid bars in the tangential direction, and
   wherein the tangential pull wires are connected with the power device, so that the tangential pull wires are tensioned or loosened by means of the power device.

3. The threshing device with two-way pull wires and adjustable threshing clearance according to claim 2, wherein the power device comprises a rotating shaft and an electric motor, wherein the radial pull wires or tangential pull wires are fixed on the rotating shaft, and wherein the electric motor is configured to rotate the rotating shaft.

4. The threshing device with two-way pull wires and adjustable threshing clearance according to claim 2, wherein the power device comprises an electric push rod and a pull rod, wherein the radial pull wires or the tangential pull wires are fixed on the pull rod, and wherein the electric push rod is configured to make the pull rod reciprocate.

5. The threshing device with two-way pull wires and adjustable threshing clearance according to claim 2, further comprising guide devices, wherein each guide device is arranged between each grid bar, respectively, and the power device, and wherein the radial pull wires are guided to be parallel to each other by the guide devices, to ensure uniform stress on the radial pull wires simultaneously.

6. The threshing device with two-way pull wires and adjustable threshing clearance according to claim 5, wherein each guide device comprises a guide mechanism and a fixing plate, wherein the guide mechanism is fixed to the fixing plate, wherein the fixing plate is mounted to a frame, wherein the radial pull wires pass through guide sleeves, so that the radial pull wires connected to the power device are parallel to each other, and wherein the guide mechanisms are guide sleeves or guide pulleys.

7. The threshing device with two-way pull wires and adjustable threshing clearance according to claim 2, further comprising elastic gaskets, which are arranged in the radial and tangential directions of the grid bars, and are connected to the radial pull wires or tangential pull wires.

8. The threshing device with two-way pull wires and adjustable threshing clearance according to claim 7, wherein the elastic gaskets comprise lower elastic gaskets, upper elastic gaskets, and right elastic gaskets,
   wherein the radial pull wire comprises an upper segment of radial pull wire and an lower segment of radial pull wire,
   wherein the upper segment of radial pull wire passes through one radial cross section of the grid bar and is connected to the lower elastic gasket,
   wherein the lower segment of radial pull wire passes through the other radial cross section of the grid bar and is connected to the upper elastic gasket,
   wherein the right elastic gaskets are arranged on both sides of the grid bar in the tangential direction, and the tangential pull wire passes through the right elastic gaskets, and
   wherein the height of the right elastic gasket does not exceed the height of the grid bar.

9. A combined harvester comprising the threshing device with two-way pull wires and adjustable threshing clearance according claim 1.

* * * * *